United States Patent
Valtari

(10) Patent No.: US 12,463,414 B2
(45) Date of Patent: Nov. 4, 2025

(54) METHOD AND SYSTEM FOR DETECTING PHENOMENON IN ELECTRICAL POWER NETWORK

(71) Applicant: ABB Schweiz AG, Baden (CH)

(72) Inventor: Jani Valtari, Vaasa (FI)

(73) Assignee: ABB Schweiz AG, Baden (CH)

( * ) Notice: Subject to any disclaimer, the term of this patent is extended or adjusted under 35 U.S.C. 154(b) by 161 days.

(21) Appl. No.: 18/246,994

(22) PCT Filed: Sep. 24, 2021

(86) PCT No.: PCT/EP2021/076411
§ 371 (c)(1),
(2) Date: Mar. 28, 2023

(87) PCT Pub. No.: WO2022/064010
PCT Pub. Date: Mar. 31, 2022

(65) Prior Publication Data
US 2024/0006868 A1 Jan. 4, 2024

(30) Foreign Application Priority Data
Sep. 28, 2020 (EP) .................................. 20198641

(51) Int. Cl.
*H02H 3/28* (2006.01)
*G01R 31/52* (2020.01)
(Continued)

(52) U.S. Cl.
CPC ............... *H02H 3/28* (2013.01); *G01R 31/52* (2020.01); *G01R 31/58* (2020.01);
(Continued)

(58) Field of Classification Search
CPC .... G01R 31/08; G01R 31/085; G01R 31/086; G01R 31/52; G01R 31/58; G01R 19/2513;
(Continued)

(56) References Cited

U.S. PATENT DOCUMENTS 10,985,558 B1\* 4/2021 Jia ......................... H02H 7/263
2016/0061873 A1 3/2016 Liu et al.
(Continued)

FOREIGN PATENT DOCUMENTS

CN 109672152 A 4/2019
EP 2169799 A2 3/2010

OTHER PUBLICATIONS

Machine Translation CN 109672152 (Year: 2019).\*
(Continued)

*Primary Examiner* — Steven L Yeninas
(74) *Attorney, Agent, or Firm* — Whitmyer IP Group LLC

(57) ABSTRACT

A method for detecting a phenomenon in an electrical power network including at least one protection zone with at least two subzones. The method including measuring in the subzones of the protection zone at least one current signal actual in the respective subzone, determining linear dependency between the at least one measured current signal actual in at least one subzone of the protection zone and the corresponding at least one measured current signal actual in at least one another subzone of the protection zone, and detecting the phenomenon in the protection zone of the electrical power network based on the at least one determined linear dependency.

Furthermore, a system for detecting a phenomenon in an electrical power network.

8 Claims, 5 Drawing Sheets

(51) Int. Cl.
*G01R 31/58* (2020.01)
*H02H 1/00* (2006.01)
*H02H 3/36* (2006.01)
*H02H 7/26* (2006.01)

(52) U.S. Cl.
CPC ............ *H02H 1/0092* (2013.01); *H02H 3/36* (2013.01); *H02H 7/261* (2013.01)

(58) Field of Classification Search
CPC ............ H02H 3/042; H02H 3/28; H02H 3/32; H02H 3/36
See application file for complete search history.

(56) References Cited

U.S. PATENT DOCUMENTS

| 2018/0196098 | A1  |  7/2018 | Ferguson |               |
|--------------|-----|---------|----------|---------------|
| 2019/0041436 | A1* |  2/2019 | Kuloor   | G01R 22/063   |
| 2019/0041445 | A1* |  2/2019 | Kuloor   | H02J 13/00006 |
| 2020/0309827 | A1* | 10/2020 | Sharon   | G01R 19/2513  |
| 2020/0409347 | A1* | 12/2020 | Berry    | G05B 23/0213  |
| 2021/0120031 | A1* |  4/2021 | Dokucu   | G06N 3/088    |
| 2021/0325441 | A1* | 10/2021 | Léonard  | G01R 31/088   |

OTHER PUBLICATIONS

Extended European Search Report; Application No. 20198641.1; Completed: Mar. 12, 2021; Mailed: Mar. 23, 2021; 3 Pages.

PCT International Search Report and Written Opinion of the International Searching Authority; Application No. PCT/EP2021/076411; Completed: Jan. 11, 2022; Mailing Date: Jan. 19, 2022; 11 Pages.

\* cited by examiner

Correlation coefficients *r* for IL1

|    | F1 | F2 | F3 | F4 |
|----|----|----|----|----|
| F1 | (IL1(F1),IL1(F1)) | (IL1(F2),IL1(F1)) | (IL1(F3),IL1(F1)) | (IL1(F4),IL1(F1)) |
| F2 | (IL1(F1),IL1(F2)) | (IL1(F2),IL1(F2)) | (IL1(F3),IL1(F2)) | (IL1(F4),IL1(F2)) |
| F3 | (IL1(F1),IL1(F3)) | (IL1(F2),IL1(F3)) | (IL1(F3),IL1(F3)) | (IL1(F4),IL1(F3)) |
| F4 | (IL1(F1),IL1(F4)) | (IL1(F2),IL1(F4)) | (IL1(F3),IL1(F4)) | (IL1(F4),IL1(F4)) |

FIG. 2a

Correlation coefficients *r* for IL2

|    | F1 | F2 | F3 | F4 |
|----|----|----|----|----|
| F1 | (IL2(F1),IL2(F1)) | (IL2(F2),IL2(F1)) | (IL2(F3),IL2(F1)) | (IL2(F4),IL2(F1)) |
| F2 | (IL2(F1),IL2(F2)) | (IL2(F2),IL2(F2)) | (IL2(F3),IL2(F2)) | (IL2(F4),IL2(F2)) |
| F3 | (IL2(F1),IL2(F3)) | (IL2(F2),IL2(F3)) | (IL2(F3),IL2(F3)) | (IL2(F4),IL2(F3)) |
| F4 | (IL2(F1),IL2(F4)) | (IL2(F2),IL2(F4)) | (IL2(F3),IL2(F4)) | (IL2(F4),IL2(F4)) |

FIG. 2b

Correlation coefficients *r* for IL3

|    | F1 | F2 | F3 | F4 |
|----|----|----|----|----|
| F1 | (IL3(F1),IL3(F1)) | (IL3(F2),IL3(F1)) | (IL3(F3),IL3(F1)) | (IL3(F4),IL3(F1)) |
| F2 | (IL3(F1),IL3(F2)) | (IL3(F2),IL3(F2)) | (IL3(F3),IL3(F2)) | (IL3(F4),IL3(F2)) |
| F3 | (IL3(F1),IL3(F3)) | (IL3(F2),IL3(F3)) | (IL3(F3),IL3(F3)) | (IL3(F4),IL3(F3)) |
| F4 | (IL3(F1),IL3(F4)) | (IL3(F2),IL3(F4)) | (IL3(F3),IL3(F4)) | (IL3(F4),IL3(F4)) |

FIG. 2c

Correlation coefficients *r* for IN

|    | F1 | F2 | F3 | F4 |
|----|----|----|----|----|
| F1 | (IN(F1),IN(F1)) | (IN(F2),IN(F1)) | (IN(F3),IN(F1)) | (IN(F4),IN(F1)) |
| F2 | (IN(F1),IN(F2)) | (IN(F2),IN(F2)) | (IN(F3),IN(F2)) | (IN(F4),IN(F2)) |
| F3 | (IN(F1),IN(F3)) | (IN(F2),IN(F3)) | (IN(F3),IN(F3)) | (IN(F4),IN(F3)) |
| F4 | (IN(F1),IN(F4)) | (IN(F2),IN(F4)) | (IN(F3),IN(F4)) | (IN(F4),IN(F4)) |

FIG. 2d

| IL1(F1) | T1 | T2 | T3 | T4 | T5 | T6 | T7 | T8 | T9 | T10 |
| IL1(F2) | T1 | T2 | T3 | T4 | T5 | T6 | T7 | T8 | T9 | T10 |
| IL1(F3) | T1 | T2 | T3 | T4 | T5 | T6 | T7 | T8 | T9 | T10 |
| IL1(F4) | T1 | T2 | T3 | T4 | T5 | T6 | T7 | T8 | T9 | T10 |

FIG. 4a

| IL1(F1) | T1 | T2 | T3 | T4 | T5 | T6 | T7 | T8 | T9 | T10 | T11 | T12 | T13 |
| IL1(F2) | T1 | T2 | T3 | T4 | T5 | T6 | T7 | T8 | T9 | T10 | T11 | T12 | T13 |
| IL1(F3) | T1 | T2 | T3 | T4 | T5 | T6 | T7 | T8 | T9 | T10 | T11 | T12 | T13 |
| IL1(F4) | T1 | T2 | T3 | T4 | T5 | T6 | T7 | T8 | T9 | T10 | T11 | T12 | T13 |

FIG. 4b

METHOD AND SYSTEM FOR DETECTING PHENOMENON IN ELECTRICAL POWER NETWORK

FIELD

The present invention relates to a method and a system for detecting a phenomenon in an electrical power network.

BACKGROUND

An electrical power network is a galvanically interconnected system, wherein a phenomenon or an incident, such as a fault, occurring at some point in the network is at least to some extent visible at all measurement points in the interconnected network, and therefore also affects to a prevailing operational condition, i.e. a state, of the electrical power network.

Generally, the electrical power network has two main operational conditions or states, i.e. a normal state of operation, wherein power is supplied to loads connected to the network without any specific abnormalities in the operation of the network, and an abnormal state of operation, wherein there is at least one phenomenon or incident deviating from a normal operation of the network, such as a fault appearing at some point in the galvanically interconnected network, and which phenomenon or incident may have some effect on the operation of the network and/or the power supply to at least one load connected to the network.

Presently the detection of a fault and management thereof is based on single point measurements, wherein feeder-specific electrical quantities prevailing in different feeders or bays of the electrical power network are measured at a specific point in each feeder. Correspondingly, the fault detection and management are carried out by feeder-specific devices, typically called protection and control relays.

Feeder-specific approach for the detection of the fault creates, especially in large networks with several incoming and outgoing feeders, a complex system with a high number of devices the operation of which should also be adjusted very accurately, especially in view of the fault management, to respond only to faults appearing in a specific protection area or zone set for that specific device. Different relays create different events and time-consuming analysis of those events are often needed for determining an actual original incident or a root cause for the event. Also, incidents for which there is no corresponding dedicated detection application available or used are missed. Therefore, it is often difficult to even recognise some incident having taken place or at least quickly determine what has happened.

SUMMARY

An object of the present invention is to provide a novel method and system for detecting a phenomenon in an electrical power network.

The invention is characterized by the features of the independent claims.

The invention is based on the idea of determining linear dependencies between current signals in different subzones of at least one protection zone in the electrical power network and to detect a phenomenon in the electrical power network based on the determined linear dependencies.

The invention provides a simple application to detect incidents or phenomena taking place at some point in the electrical power network.

Some embodiments of the invention are disclosed in the dependent claims.

BRIEF DESCRIPTION OF THE DRAWINGS

In the following the invention will be described in greater detail by means of preferred embodiments with reference to the accompanying drawings, in which

FIGS. 2a, 2b, 2c and 2d disclose schematically correlation coefficients determined for current signals actual in phases of feeders connected to the substation of FIG. 1;

FIGS. 4a and 4b disclose schematically exemplary sample sequences used for detecting a phenomenon in an electrical power network;

For the sake of clarity, the figures show some embodiments of the invention in a simplified manner. Like reference numerals identify like elements in the Figures.

DETAILED DESCRIPTION

Figure 1:
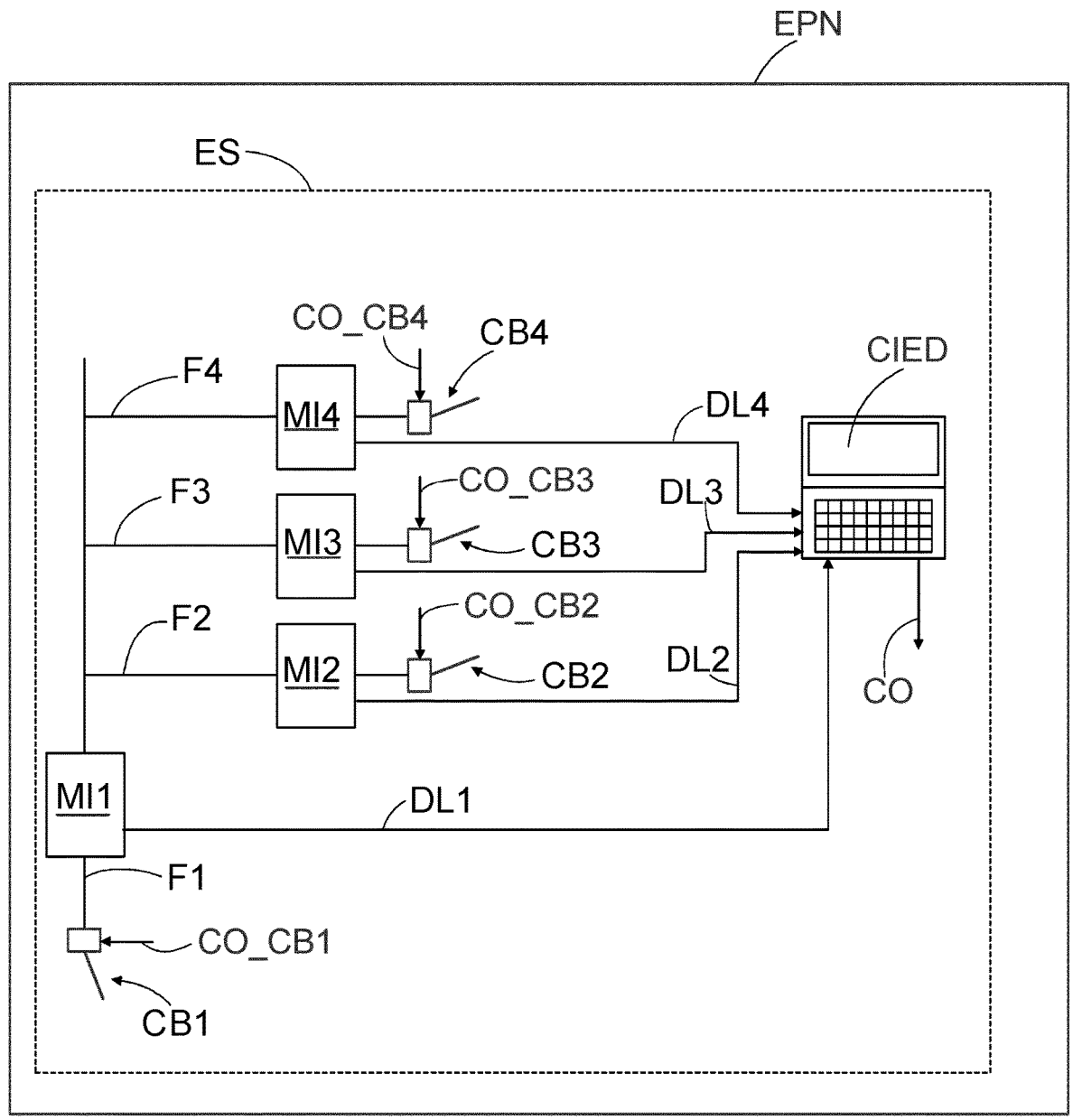
FIG. 1 is a schematic illustration of a substation in an electrical power network.

FIG. 1 is a schematic illustration of an electric station ES, or a substation ES, illustrated schematically with a box of dashed line. The electric station ES forms a part of an electrical power network EPN, illustrated schematically with a box of solid line.

The electric station ES comprises or is provided with one incoming feeder F1, i.e. the first feeder F1, supplying power to the electric station ES. FIG. 1 further discloses three outgoing feeders F2, F3 and F4, i.e. the second feeder F2, the third feeder F3 and the fourth feeder F4, supplying power forward from the electric station ES. The number of the incoming and outgoing feeders is not, however, limited to that shown in FIG. 1. Depending on electrical power network configuration and possible distributed power generation arranged in the network, some of the feeders may be configured to operate at different times either as incoming feeders or outgoing feeders at different electrical power network configurations. The electric station ES with at least one incoming feeder and with at least one outgoing feeder provides one type of nodal point in an electrical power network.

For the sake of clarity, in FIG. 1 only one line, i.e. a line denoted by the reference sign F1, F2, F3 or F4, is used to indicate all phase lines and possible neutral conductor of the respective feeder. The actual number of the phase lines and availability of the neutral conductor are dependent on local electricity supply practices. In the following it is assumed that each feeder F1, F2, F3, F4 comprise three phase lines, i.e. the first phase L1, the second phase L2 and the third phase L3 as well as the neutral conductor N.

In the following, it may for example be assumed that the incoming feeder F1 represents a high voltage transmission line, such as a 110 kV transmission line, and the outgoing feeders F2, F3 and F4 represent medium voltage distribution lines such as 20 kV distribution lines, and the electric station ES represents a primary distribution substation. The applicability of the solution disclosed herein is not, however, limited only to that kind of electric power network configuration but it can be utilized in any electric power network configuration comprising a suitable nodal point with appropriate number of incoming and outgoing feeders.

FIG. 1 discloses also a central intelligent electronic device CIED, that may be configured to receive measurement or operational information obtained from devices connected to the electrical power network EPN and process the information received by running various software-based applications using the received information as input and/or to transmit the received information further. The central intelligent electronic device CIED may also be configured to control the devices connected to the electrical power network EPN based on the processed information or information received from a higher-level control application. For that purpose, the central intelligent electronic device CIED may comprise a control output CO for controlling operation of other devices connected to the electrical power network EPN. In the example of FIG. 1 the central intelligent electronic device CIED is located at the electric station ES and it may for example be a computer, like a substation computer provided with a high computing power. Other locations and implementations for the central intelligent electronic device CIED are, however, possible.

Each one of the feeders F1 to F4 comprise a respective measurement instrument for measuring electrical quantities actual in the respective feeder. So, the first feeder F1 comprises a first measurement instrument MI1 for measuring electrical quantities actual in the first feeder F1, the second feeder F2 comprises a second measurement instrument MI2 for measuring electrical quantities actual in the second feeder F2, the third feeder F3 comprises a third measurement instrument MI3 for measuring electrical quantities actual in the third feeder F3 and the fourth feeder F4 comprises a fourth measurement instrument MI4 for measuring electrical quantities actual in the fourth feeder F4.

Generally, the electrical quantity of the electrical power network EPN under interest may be zero voltage (residual voltage), zero current (residual current), at least one phase voltage and/or at least one phase current, whereby the measurement instruments MI1 to MI4 may comprise means for measuring both voltage and current information necessary. In the solution presented herein, as disclosed in more detailed below, only the phase currents and the zero current, i.e. the residual current, are the electrical quantities under interest. Therefore, the measurement instruments MI1 to MI4 may comprise only instrument transformers for measuring only the necessary current information, whereby the first measurement instrument MI1 may be configured to measure phase currents IL1 (F1), IL2(F1), IL3(F1) in the phases L1, L2, L3 and residual current IN(F1) in the neutral conductor N in the first feeder F1, the second measurement instrument MI2 may be configured to measure phase currents IL1(F2), IL2(F2), IL3(F2) in the phases L1, L2, L3 and residual current IN(F2) in the neutral conductor N in the second feeder F2, the third measurement instrument MI3 may be configured to measure phase currents IL1 (F3), IL2(F3), IL3(F3) in the phases L1, L2, L3 and residual current IN(F3) in the neutral conductor N in the third feeder F3 and the fourth measurement instrument MI4 may be configured to measure phase currents IL1 (F4), IL2(F4), IL3(F4) in the phases L1, L2, L3 and residual current IN(F4) in the neutral conductor N in the fourth feeder F4.

Each measurement instrument MI1 to MI4 is connected to the central intelligent electronic device CIED by a respective data transmission line DL1 to DL4 for transmitting the measurement information obtained by the respective measurement instrument MI1 to MI4 to the central intelligent electronic device CIED. To be more precise, the measurement information obtained by the first measurement instrument MI1 is transmitted to the central intelligent electronic device CIED by a first data transmission line DL1, the measurement information obtained by the second measurement instrument MI2 is transmitted to the central intelligent electronic device CIED by a second data transmission line DL2, the measurement information obtained by the third measurement instrument MI3 is transmitted to the central intelligent electronic device CIED by a third data transmission line DL3 and the measurement information obtained by the fourth measurement instrument MI4 is transmitted to the central intelligent electronic device CIED by a fourth data transmission line DL4. The actual implementations of the data transmission lines DL1 to DL4 may be wired and/or wireless.

The measurement information obtained by the measurement instruments MI1 to MI4 is typically represented by one or more sequences of samples of the respective electrical quantities to be measured, these being herein, as said above, the phase currents and the residual current, actual in the respective feeder. To provide the samples of the electrical quantity under interest, the measurement instruments MI1 to MI4 are provided with respective sampling circuits configured to take the samples of the electrical quantity under interest. The general construction and operation of different sampling circuits are generally known for a person skilled in the art and are therefore not considered herein in more detail. In order to transmit the obtained sample(s) or sample sequence(s) to the central intelligent electronic device CIED, the measurement instruments MI1 to MI4 are provided with respective transmitters, the general construction and operation of different transmitters being generally known for a person skilled in the art and therefore not considered herein in more detail. In the event of the measurement instrument not comprising the sampling circuit or the transmitter, the measurement instrument may be connected to a feeder-specific intelligent electronic device, such as a data collector, that provides the corresponding functionalities.

The feeders F1 to F4 are also provided with a respective circuit breaker by operation of which the respective feeder may be disconnected from the galvanic connection with the other feeders or to be connected back to the galvanic connection with the other feeders. To be more precise, the first circuit breaker CB1 may be operated to disconnect the first feeder F1 from the galvanic connection with the other feeders F2, F3, F4 or to connect it back to the galvanic connection with them, the second circuit breaker CB2 may be operated to disconnect the second feeder F2 from the galvanic connection with the other feeders F1, F3, F4 or to connect it back to the galvanic connection with them, the third circuit breaker CB3 may be operated to disconnect the third feeder F3 from the galvanic connection with the other feeders F1, F2, F4 or to connect it back to the galvanic connection with them and the fourth circuit breaker CB4 may be operated to disconnect the fourth feeder F4 from the galvanic connection with the other feeders F1, F2, F3 or to connect it back to the galvanic connection with them. The circuit breaker CB1 in the incoming feeder F1 may be arranged either at low-voltage side or high-voltage side of a transformer (not shown) at the electric station ES.

By opening any of the circuit breaker CB1, CB2, CB3, CB4, the power supply from the respective feeder or the power supply to the respective feeder may be prevented. By closing any of the circuit breaker CB1, CB2, CB3, CB4, the power supply from the respective feeder or the power supply to the respective feeder may be restored. Each of the circuit breakers CB1, CB2, CB3, CB4 thus provides a coupling device which in its' closed state is configured to connect the power supply to/from the respective feeder and in its' open state is configured to disconnect the power supply to/from the respective feeder. The circuit breaker CB1, CB2, CB3, CB4 may comprise a single coupling device common for all the phase lines L1, L2, L3 or phase-line-specific coupling devices allowing a phase-line-specific opening and closing. The circuit breakers CB1, CB2, CB3, CB4 comprise respective control connections CO-CB1, CO-CB2, CO-CB3, CO-CB4 for receiving control signals through which the operation of the circuit breakers CB1, CB2, CB3, CB4 may be controlled. A need to disconnect the power supply to/from the respective feeder may arise for example because of a fault in the respective feeder, whereby equipment or components both in the faulty feeder as well as in other parts of the galvanically interconnected electrical power network can be protected against harmful overvoltage or overcurrent, for example. After the fault has been cleared or eliminated, the power supply may be restored by closing the respective circuit breaker.

In the example of FIG. 1 the electric station ES provides or forms one protection zone in the electrical power network EPN, and each feeder F1, F2, F3, F4 provides or forms a subzone of the protection zone, the protection zone in the example of FIG. 1 thus comprising altogether four subzones that are galvanically interconnected. In the event of removing at least one feeder from service, or in the event of network configuration changes disconnecting at least one feeder from the electric station ES or in the event of connecting at least one more feeder to the electric station ES the number of the subzones in the protection zone may change. In addition to the subzones formed by the feeders the protection zone may comprise additional subzones, including for example subzones for a transformer/transformers or buses at the electric station ES.

The electric station ES of FIG. 1 and the disclosure above is only one example wherein the solution for detecting a phenomenon or incident in the electrical power network disclosed next may be utilized. In practice there is an innumerable number of different network configurations or topologies wherein the solution disclosed herein is applicable. In the following a detailed example of the solution is explained here, especially in view of the phase line L1 but similar consideration is applicable also to other phase lines L2, L3 and the neutral conductor N.

Generally, the electrical power network EPN has two main operational conditions or states. The first main operational condition or state of the electrical power network is a normal state of operation, wherein power is supplied to loads connected to the network without any specific abnormalities in the operation of the network. The second main operational condition or state of the electrical power network is an abnormal state of operation, wherein there is at least one phenomenon or incident deviating from the normal operation of the network, such as a fault appearing at some point in the galvanically interconnected network, and which phenomenon or incident may have some effect on the operation of the network and/or on the power supply to at least one load connected to the network. Especially a phenomenon or an incident causing a need to provide some control operations to be carried out in the electrical power network can be considered to form a phenomenon of interest or an incident of interest in the network. In addition to faults appearing in network that kind of phenomenon of interest or incident of interest may also be a connection/disconnection of high-power load to/from the network.

In the solution disclosed herein for detecting a phenomenon or an incident in a protection zone of an electrical power network EPN, it is measured, by a respective measurement instrument, in the subzones of the galvanically interconnected protection zone at least one current signal actual in the respective subzone, linear dependency between the at least one measured current signal actual in at least one subzone of the protection zone and the corresponding at least one measured current signal actual in at least one another subzone of the protection zone are determined by at least one intelligent electronic device, and the phenomenon in the protection zone of the electrical power network is detected based on the at least one determined linear dependency by at least one intelligent electronic device.

In other words, referring to the example of FIG. 1, in the feeders forming the protection zone one or more corresponding current signals, i.e. corresponding phase current(s) and/or residual current, actual in the feeders are measured and linear dependencies between the corresponding measured current signals, i.e. corresponding phase current(s) and/or residual current, actual in at least one feeder and in at least one another feeder are determined. During normal state of network operation there are only weak, if any, linear dependencies actual between the phase current(s) and/or residual current in the different feeders, but during abnormal state of network operation there are typically substantially strong linear dependencies actual between the phase current(s) and/or residual current of at least some feeders.

According to an embodiment it is determined linear dependencies between the at least one measured current signal actual in each subzone of the protection zone and the corresponding at least one measured current signal actual in each another subzone of the protection zone, and the phenomenon in the protection zone of the electrical power network is detected based on the determined linear dependencies. Referring to the example of FIG. 1, linear dependencies between the measured current signal(s) actual in each subzone of the protection zone and the corresponding measured current signal(s) actual in each another subzone of the protection zone are determined and the phenomenon in the protection zone of the electrical power network is detected based on the determined linear dependencies. In this embodiment there are determined linear dependencies between each subzones of the protection zone. In its minimum the phenomenon or incident taking place in the protection zone may be detected by monitoring the linear dependency only between two subzones but preferably there are at least three subzones between which the linear dependencies are to be monitored. The higher the number of the subzones between which the linear dependencies are determined, the higher the sensitivity to detect the phenomena or incidents taking place in the protection zone.

According to an embodiment the linear dependency between the current signal actual in the subzone of the protection zone and the corresponding current signal actual in another subzone of the protection zone may be determined by determining, by at least one intelligent electronic device, correlation between the measured current signal actual in the subzone and the corresponding measured current signal actual in the another subzone. In other words, the linear dependencies between the current signals in the subzones may be determined by determining correlations between one or more corresponding measured current signals, i.e. corresponding phase current(s) and/or residual current, actual in the subzones. The correlation provides an efficient way to determine the linear dependencies between the one or more currents signals actual in different subzones forming the interconnected protection zone in the electrical power network. It is to be noted herein that the correlation computation is only one possible way to determine the linear dependency between two time series. For example, a pure summation or difference of two time series provide some examples of other ways to determine the linear dependency between two time series.

According to an embodiment the linear dependency between the measured current signal actual in the subzone and the corresponding measured current signal actual in another subzone may be determined by computing correlation coefficient between the measured current signal actual in the subzone and the corresponding measured current signal actual in the another subzone. In other words, the linear dependencies between the at least one measured current signal actual in the subzone and the corresponding at least one measured current signal actual in at least one another subzone may be determined by computing, by at least one intelligent electronic device, the correlation coefficients between one or more corresponding measured current signals, i.e. corresponding phase current(s) and/or residual current, actual in the subzone and in at least one another subzone. The computation of the correlation coefficient is a simple and efficient way to provide the information about the linear dependency between the at least one measured current signal actual in the subzone and the corresponding at least one measured current signal actual in at least one another subzone because it provides a numerical measure of the linear dependency or linear relationship, i.e. of a strength of linear dependency or of a degree of linear dependency between two variables, if the relationship between the two variables is suspected to be linear.

The Pearson product-moment correlation coefficient is one of the most common correlation coefficients used and it is defined as the covariance of the variables divided by the product of their standard deviations:

$$r_{x,y} = \frac{\text{Cov}(x, y)}{\sigma_x \sigma_y}, \quad (1)$$

wherein r is the Pearson product-moment correlation coefficient, Cov(x,y) is covariance of x and y. $\sigma_x$ and $\sigma_y$ are the standard deviation of x and y. Here, r is a dimensionless quantity, with a range from −1 to +1, i.e. −1≤r≤+1.

When considering linear dependencies between the phase currents IL1 (F1), IL1 (F2), IL1 (F3), IL1 (F4) actual in the first phase L1 in the feeders F1, F2, F3, F4 of the protection zone in the electrical power network EPN of FIG. 1, the linear dependencies therebetween may thus be determined for example by computing correlation coefficients between the phase current IL1(F1), IL1 (F2), IL1 (F3), IL1 (F4) actual in the first phase L1 in each feeder F1, F2, F3, F4 and the corresponding phase current IL1 (F1), IL1 (F2), IL1 (F3), IL1 (F4) actual in the first phase L1 in each another feeder F1, F2, F3, F4. The computation of the correlation coefficients results to a set of altogether sixteen correlation coefficients for phase currents for the first phase L1 of the protection zone of the electrical power network EPN of FIG. 1: r(IL1(F1), IL1(F1)), r(IL1(F1), IL1 (F2)), r(IL1 (F1), IL1(F3)), r(IL1 (F1), IL1 (F4)), r(IL1 (F2), IL1 (F1)), r(IL1 (F2), IL1 (F2)), r(IL1 (F2), IL1 (F3)), r(IL1 (F2), IL1 (F4)), r(IL1 (F3), IL1 (F1)), r(IL1 (F3), IL1 (F2)), r(IL1 (F3), IL1 (F3)), r(IL1 (F3), IL1 (F4)), r(IL1 (F4), IL1 (F1)), r(IL1 (F4), IL1 (F2)), r(IL1 (F4), IL1 (F3)), r(IL1 (F4), IL1 (F4)). For visual illustration, the computed correlation coefficients may be collected into a form of a matrix, as shown schematically in FIG. 2a. Because a correlation of a variable with itself is always one, the value of the correlation coefficients r(IL1 (F1), IL1 (F1)), r(IL1 (F2), IL1 (F2)), r(IL1 (F3), IL1 (F3)) and r(IL1 (F4), IL1 (F4)) are one and therefore need not actually be computed at all.

The linear dependencies between the phase currents in the phases L2 or L3 or the zero or residual current in the neutral conductor N between the feeders F1, F2, F3, F4 may be determined correspondingly, whereby altogether four sets of correlation coefficients with sixteen correlation coefficients in each set may be provided, i.e. one set of correlation coefficients for phase current IL2, one set of correlation coefficients for phase current IL3 and one set of correlation coefficients for residual current IN, as shown schematically in FIGS. 2b, 2c and 2d.

In the following, it is considered in more detail an embodiment for detecting a phenomenon or an incident in a protection zone of an electrical power network, referring to FIGS. 1, 3 and 4, wherein FIG. 3 discloses schematically some procedural steps for detecting the phenomenon or incident in the electrical power network and FIGS. 4a and 4b disclose schematically exemplary sample sequences used in the determination of the correlation coefficients.

Figure 3:
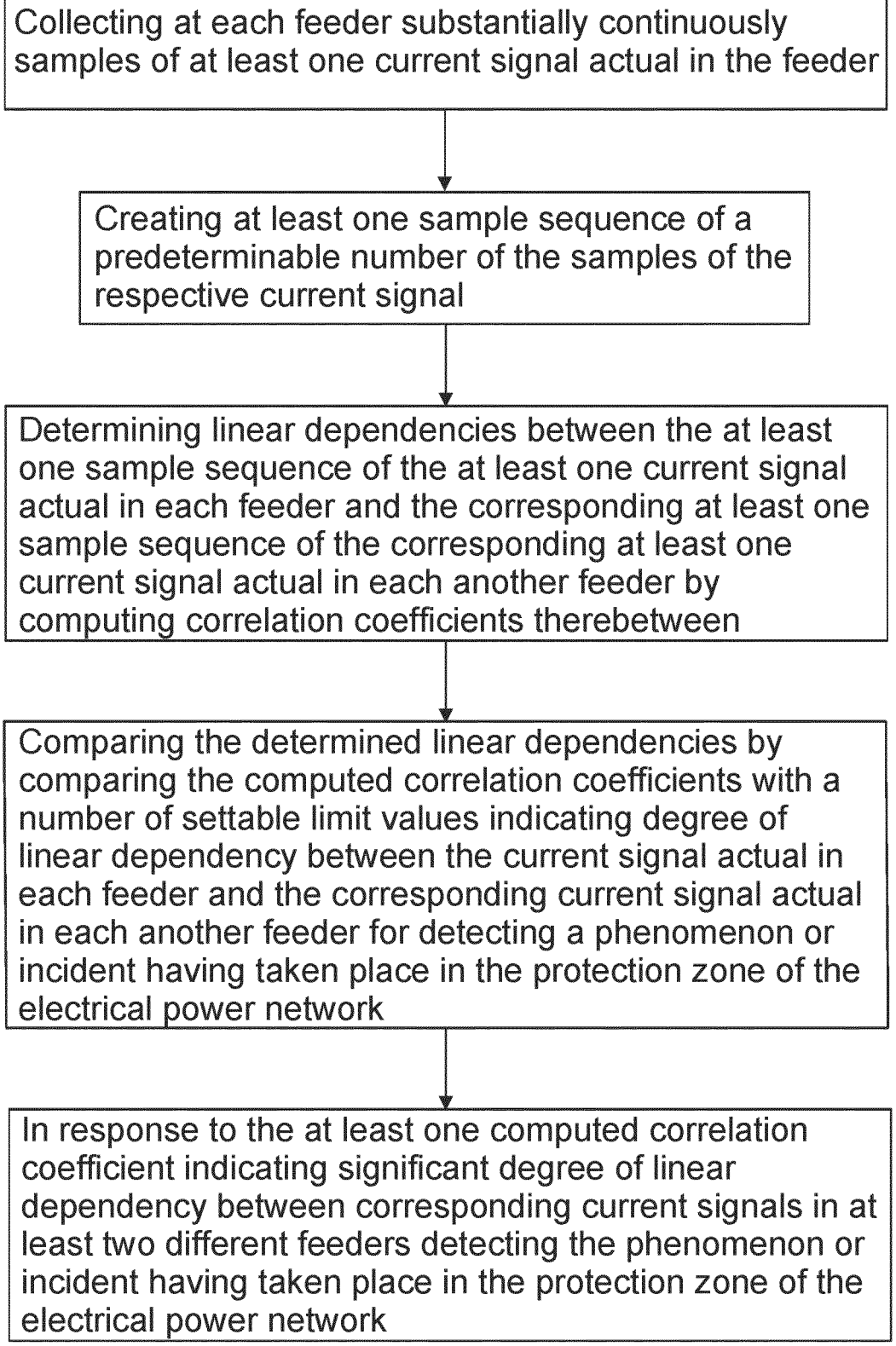
FIG. 3 discloses schematically an embodiment of a solution for detecting a phenomenon in an electrical power network.

As a first step in FIG. 3, it is collected, by respective measurement instruments, at each feeder substantially continuously samples of at least one current signal actual in the feeder. Preferably the samples are collected in all phase lines in the protection zone of the electrical power network, as well as in the neutral conductor if available, in all the feeders in the protection zone of the network.

Thereby, referring to FIG. 1, the first measurement instrument MI1 is configured to collect, substantially continuously, samples of the phase currents IL1, IL2, IL3 and the residual current IN in the first feeder F1. Correspondingly the other measurements instruments MI2, MI3, MI4 are configured to collect, substantially continuously, samples of the phase currents IL1, IL2, IL3 and the residual current IN in the respective feeder F2, F3, F4. The samples are transmitted to the central intelligent electronic device CIED for further processing.

In the next step in FIG. 3, the at least one sample sequence of a predeterminable number of the samples of the respective current signal is created. To be more precise, it is created at least one sample sequence for each current signal measured in each feeder. Thereby, referring to the example of FIG. 4, it is created altogether at least sixteen sample sequences, i.e. one sample sequence for phase current IL1, IL2, IL3 and residual current IN measurements in each feeder FI, F2, F3, F4. The creation of the sample sequences may be carried out in the central intelligent electronic device CIED unless provided by the measurement instrument.

FIG. 4a discloses schematically four sample sequences, each sample sequence comprising ten samples T1 to T10 taken at different time instants Tk, k=1, . . . 10, the sample sequences measured in the first phase L1 of each feeder F1, F2, F3, F4. FIG. 4a thus discloses one sample sequence for the current signal in the first phase L1 of each feeder F1, F2, F3, F4.

The number of the sample sequences for each current signal in the electrical power network could also be higher, for example there could be two sample sequences with different number of samples for each current signal in the electrical power network. In that case a first sample sequence could have a lower number of samples and a second sample sequence could have a higher number of samples. The first sample sequence could thereby be intended to be used for protection purposes, i.e. for protecting the electrical power network against undesirable phenomena or incidents taking place in the protection zone of the electrical power network, such as faults, whereby the number of the samples in the sample sequence could correspond to a time period of for example 5 ms to 20 ms with 50 Hz fundamental frequency electrical power network. Because the number of the samples in the sample sequence is multiplied by the number of the sample sequences of the corresponding current signals from different feeders available, a very low number of samples in a single sample sequence may be adequate to detect the fault taking place in the protection zone of the electrical power network. The second sample sequence, in turn, could be used to non-real time post-fault analysis of the phenomena or incidents before and after the fault, whereby the number of the samples in the sample sequence could correspond to a time period of for example 200 ms to 400 ms with 50 Hz fundamental frequency electrical power network such that at least some of the samples are obtained before the phenomenon or incident having taken place and at least some of the samples are obtained after the phenomenon or incident having taken place.

As the next step in the embodiment of FIG. 3 it is computed correlation coefficients between the at least one sample sequence of the at least one current signal actual in each feeder and the corresponding at least one sample sequence of the corresponding at least one current signal actual in each another feeder. Referring to the example of FIG. 4a, it is computed correlation coefficients between the sample sequence IL1 (F1) of the first phase current IL1 in the first feeder F1 and the sample sequence IL1 (F2) of the first phase current IL1 in the second feeder F2, between the sample sequence IL1 (F1) of the first phase current IL1 in the first feeder F1 and the sample sequence IL1 (F3) of the first phase current IL1 in the third feeder F3 and between the sample sequence IL1 (F1) of the first phase current IL1 in the first feeder F1 and the sample sequence IL1 (F4) of the first phase current IL1 in the fourth feeder F4, until the first line in the matrix of FIG. 2a is completed. The computation of the correlation coefficients is continued until all the correlation coefficients obtainable have been computed, i.e. until all the correlation coefficients disclosed schematically in FIGS. 2a, 2b, 2c and 2d have been determined. The computation of the correlation coefficients may be carried out in the central intelligent electronic device CIED.

Generally, the Pearson correlation coefficient r between measurement series x and y written as $(x_1,y_1), (x_2,y_2), \ldots (x_n,y_n)$ can be calculated with the equation:

$$r = \frac{\sum_{k=1}^{n} x_k y_k - n\overline{xy}}{(n-1)\sigma_x \sigma_y}, \quad (2)$$

wherein n is the length of the data set, from which the correlation coefficients are to be calculated, n thus being ten in view of the example of FIG. 4a. $x_k$ are individual samples of the measurement x at time instant k and $y_k$ are individual samples of the measurement y at the time instant k. $\overline{x}$ is the mean value of measurement x and $\overline{y}$ is a mean value of measurement y.

Because the new samples are obtained substantially continuously with a sampling frequency of typically several kilohertz, the amount of data samples would be tremendous unless older samples would be neglected. Therefore, according to an embodiment, in response to the collection of at least one new sample of the current signal it is included in the respective sample sequence to be the at least one last sample in the sample sequence and it is discarded from the respective sample sequence the corresponding number of samples being first in the sample sequence, and the correlation coefficients are thereafter computed between the at least one sample sequence of the at least one current signal actual in each feeder and the corresponding at least one sample sequence of the corresponding at least one current signal actual in each another feeder. Example sample sequences like that are disclosed schematically in FIG. 4b, wherein at the time instant T13 the three oldest samples T1, T2, T3 in each sample sequence have been discarded and the three newest samples T11, T12, T13 have been included in each sample sequence. According to this embodiment, the correlation coefficients are computed for the sample sequences by utilizing sliding time-window, whereby new samples are taken into account in the computation and respective number of oldest samples are discarded from the computation.

According to an embodiment, for detect a possible phenomenon or incident, such as a fault, in the protection zone of the electrical power network EPN, the computed correlation coefficients are compared, by at least one intelligent electronic device, with at least one, i.e. one or more, settable or fixed limit value indicating a significance of linear dependency, i.e. degree of linear dependency, between the current signal actual in each feeder and the corresponding current signal actual in each another feeder. This step has been shown schematically in the example of FIG. 3. The limit value(s) may be set for example in the central intelligent electronic device CIED. The limit values indicating the significance of the linear dependency may for example be set according to the following principle:

0 indicates that there is no linear dependency between the corresponding phase current(s) or residual currents in the two subzones to be examined at a time;

+1 indicates perfectly linear positive dependency, i.e. the corresponding phase current(s) or residual currents in the two subzones to be examined at a time will increase or decrease at the same time;

−1 indicates perfectly linear negative dependency, i.e. the corresponding phase current(s) or residual current in one of the two subzones to be examined at a time will increase when the phase cur-rent(s) or residual current in the other subzone to be examined will decrease;

$0 < r \leq 0.3$ and $-0.3 \leq r < 0$ indicates a weak positive linear or weak negative linear dependency between the corresponding phase cur-rent(s) or residual currents in the two subzones to be examined at a time;

$0.3 < r \leq 0.7$ and $-0.7 \leq r < -0.3$ indicates a moderate positive linear or moderate negative linear dependency between the corresponding phase current(s) or residual currents in the two subzones to be examined at a time; and $0.7 < r < +1$ and $-1 < r < -0.7$ indicates a strong positive linear or strong negative linear dependency between the corresponding phase current(s) or residual currents in the two subzones to be examined at a time.

According to an embodiment, an absolute value for the limit value for indicating significant degree of linear dependency between the measured current signal actual in one subzone and the corresponding measured current signal actual in one another subzone may be set to be for example 0.5, whereby correlation coefficients having the value ≤−0.5 is considered to indicate significant degree of negative dependency between the current signals actual in the two subzones in question and correlation coefficients having the value ≥0.5 is considered to indicate significant degree of positive dependency between the current signals actual in the two subzones in question. Other selection for the absolute value for the limit value for indicating significant degree of linear dependency between the measured current signal actual in one subzone and the corresponding measured current signal actual in one another subzone may, of course, be selected.

According to an embodiment, in response to the at least one computed correlation coefficient indicating significant degree of linear dependency between corresponding current signals in at least two different subzones, it is indicated, by at least one intelligent electronic device, an abnormal phenomenon or incident having taken place in the protection zone of the electrical power network. This step has been shown schematically in the example of FIG. 3. The abnormal phenomenon or incident in the protection zone of the electrical power network indicates that there is at least one phenomenon or incident deviating from the normal operation of the network, such as a fault appearing at some point in the galvanically interconnected network in the protection zone of the electrical power network.

In the event of not a single correlation coefficient indicating any significant degree of linear dependency between corresponding current signals in at least two different subzones it is assumed that the electrical power network is operating in a normal state of operation, i.e. in a state wherein power is supplied to loads connected to the network without any specific abnormalities in the operation of the network.

According to an embodiment, in response to an abnormal state of the protection zone of the electrical power network being indicated, it is compared, by at least one intelligent electronic device, the correlation coefficients indicating significant linear dependency between corresponding current signals in at least two different subzones for determining the subzone where the undesired phenomenon or incident has taken place and/or a type of phenomenon or incident, such as a fault, therein. The type of the fault may for example be a short-circuit fault involving two or more phase lines or a phase-to-earth fault, i.e. an earth fault, involving one or more phase lines.

According to an embodiment, in response to indicating the abnormal phenomenon or incident, especially the fault, in the at least one subzone a protection operation is initiated, by the at least one intelligent electronic device, for clearing or eliminating the fault. In other words, the at least one intelligent electronic device initiates a procedure to clear the fault by providing a control signal through the communication channel thereof to the respective circuit breaker to disconnect the power supply from/to the faulty subzone/feeder, either in some or all phase lines thereof, typically for a very short time, only for a few milliseconds, for example. The solution disclosed herein may thus be applied in the protection of the electrical power network EPN against faults therein, and the length of the sample sequences applied in the protection applications may be like that disclosed shortly above.

According to an embodiment, in response to the at least one computed correlation coefficient indicating significant degree of linear dependency between corresponding current signals in at least two different subzones, at least one sample sequence of the corresponding current signals in each subzone is stored for post-incident analysis. The current signals may be stored into a non-volatile memory in the central intelligent electronic device CIED, for example, or into a higher-level system in the control of the electrical power network EPN. The length of the sample sequences to be stored may be like that disclosed shortly above.

The solution disclosed herein has several advantageous effects in monitoring the operation of the electrical power network and detecting phenomenon or incidents, such as faults, appearing therein.

The solution is simple to implement since it uses mainly statistical analysis of the measurements, which means that there is no need for extensive power system theory, but it is based only on fundamental nature of networked systems.

The computation of correlation coefficients is implemented directly with the measured samples of the respective current signals, i.e. there is no need to separate fundamental network frequency components and higher order harmonic components from each other in the current signals or to implement computation based on phasor values of the above mentioned frequency components in the current signals. In other words, the disclosed solution utilizes the whole frequency spectrum of the phenomenon or incident.

Additionally, only a small number of parameters, i.e. one or more limit values, are needed for detecting an abnormal phenomenon or incident having taken place in the network.

Also, possible fault taking place in the network may be detected more rapidly with the disclosed solution than the presently used applications. The present application being based on phasor computation need at their minimum a sample sequence length of at least one fundamental frequency cycle, whereas, according to preliminary off-line tests, similar faults have been able to be detected with the disclosed solution within even a quarter of one fundamental frequency cycle. As said above, this is based on the high amount of the available data, i.e. all the current measurements from all the subzones/feeders forming the protection zone in the interconnected network, although a single current sample sequence does not comprise a very high number of samples.

Also, the utilization of all the available current data from all the subzones forming the protection zone/feeders in the interconnected electrical power network may also increase the sensitivity of the detection of faults, especially high-impedance earth faults that typically not cause any easily detectable rise in the amplitude of the residual current in a single feeder.

Figure 5:
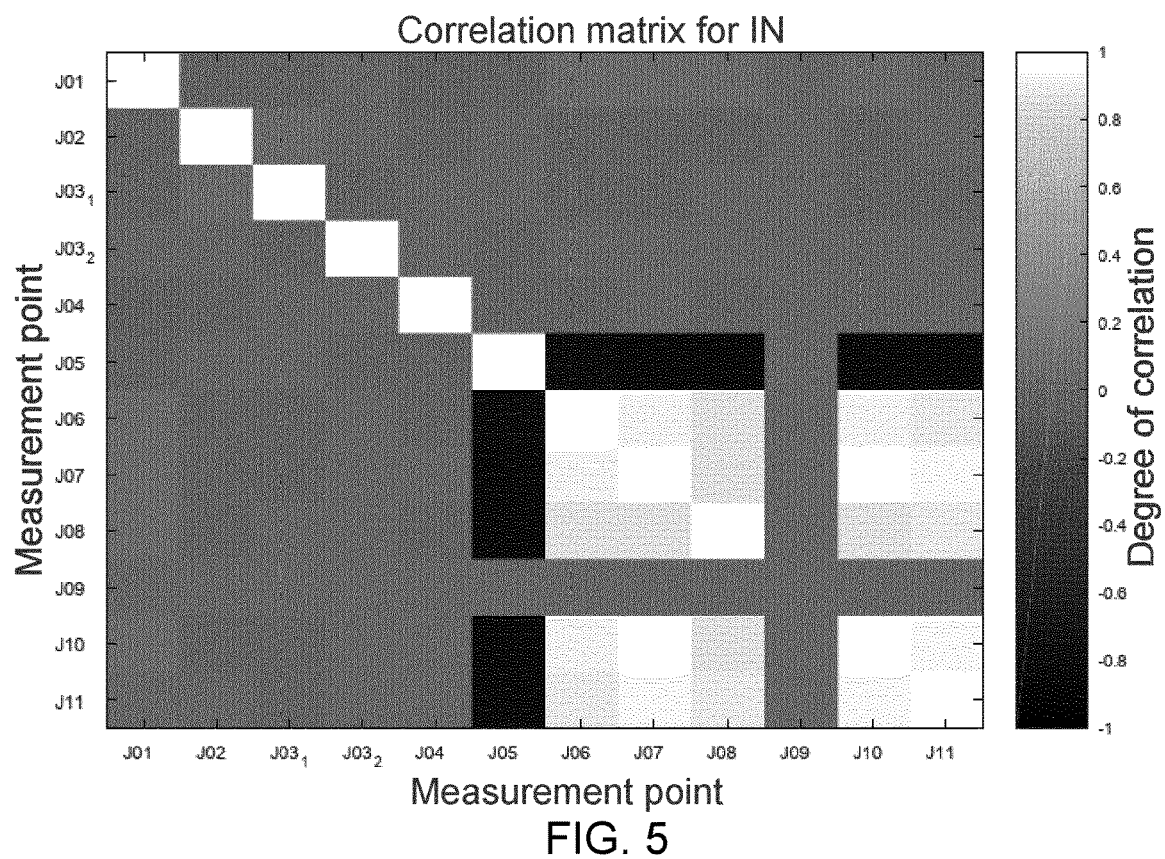
FIG. 5 is a schematic illustration of correlation coefficients determined for measured residual currents having been actual in different feeders of a substation in an electrical power network during an earth fault in one of the feeders.
Figure 6:
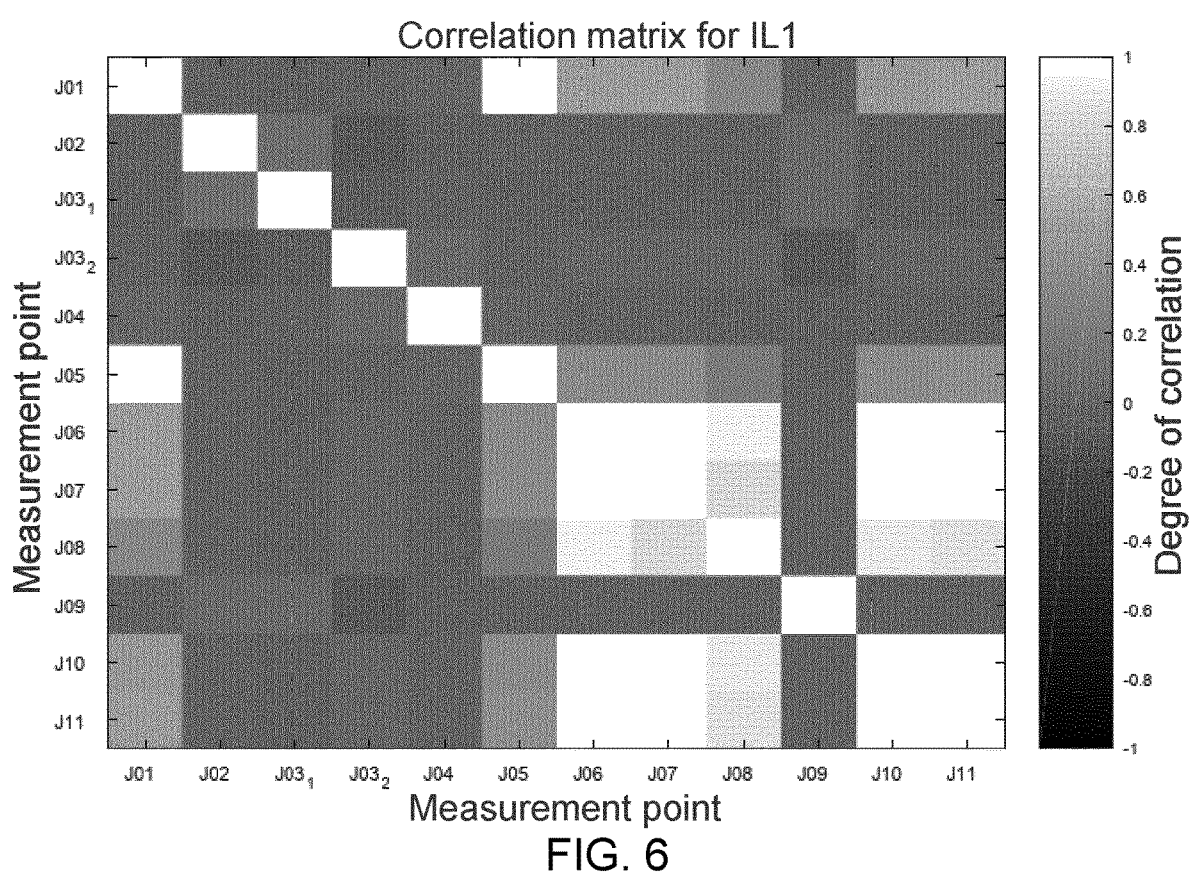
FIG. 6 is a schematic illustration of correlation coefficients determined for measured phase currents having been actual in one phase in different feeders of a substation in an electrical power network during a short circuit fault in one of the feeders.

FIGS. 5 and 6 show schematically illustrations about correlation coefficients computed for specific current measurements collected at a 110 kV/20 kV substation at a substation of an electrical power network during actually happened fault incidents, the electrical power network having altogether eleven measurement points, denoted by reference signs J01 to J11 in FIGS. 5 and 6. In FIGS. 5 and 6 reference sign J01 refers to a measurement point in 110 kV incoming feeder supplying power to the substation and reference signs J05, J06, J07, J08, J10 and J11 refer to measurement points in respective 20 kV outgoing feeders. Reference signs J02, J03, J04 and J09 refer to measurement points that are either measurement points internal of the substation or measurement points at feeders not in use.

FIG. 5 is a schematic illustration, in a form of a matrix, of correlation coefficients determined for measured zero currents or residual currents having been actual in different measurement points of the substation during an earth fault in feeder respective to the measurement point J05. From FIG. 5 it can be seen a strong negative correlation between the measurement point J05 in one outgoing feeder and the measurement points J06, J07, J08, J10, J11 in the respective other outgoing feeders. That strong negative correlation results from the phenomenon that residual current flows from the healthy outgoing feeders corresponding to the measurement points J06, J07, J08, J10, J11 to the faulty feeder corresponding to the measurement point J05. Because there is not at least any appreciable residual current in the other measurement points J01, J02, J03, J04, J09, there is not any appreciable correlation between the faulty feeder corresponding to the measurement point J05 and the other healthy parts of the substation corresponding to the measurement points J01, J02, J03, J04, J09.

In the correlation coefficients of FIG. 5 the strong negative correlation in the residual current between the faulty outgoing feeder corresponding to the measurement point J05 and the healthy outgoing feeders corresponding to the measurement points J06, J07, J08, J10, J11 indicates an earth fault in the outgoing feeder corresponding to the measurement point J05. This indication may further be verified by not having any appreciable correlation between the faulty feeder corresponding to the measurement point J05 and the other healthy parts of the substation corresponding to the measurement points J01, J02, J03, J04, J09. Therefore, according to an embodiment, an earth fault in an outgoing feeder may be detected by a strong negative correlation in the residual current between an outgoing feeder and at least one another outgoing feeder.

Because a correlation of a variable with itself is always one, a diagonal in the matrix of FIG. 5, as well as the diagonal in the matrixes of FIG. 6 later, indicate the perfectly linear positive dependency.

FIG. 6 is a schematic illustration, in a form of a matrix, of correlation coefficients determined for measured phase currents having been actual in phase L1 in different measurement points of the substation during a short circuit fault in feeder respective to the measurement point J05. From FIG. 6 it can be seen a strong positive correlation between the measurement point J05 in the respective outgoing feeder and the measurement point J01 in the respective incoming healthy feeder. That strong positive correlation results from the phenomenon that in phase L1 of the network the phase current flows from the healthy incoming feeder corresponding to the measurement point J01 mainly to the faulty feeder corresponding to the measurement point J05 with high current. The healthy outgoing feeders corresponding to the measurement points J06, J07, J08, J10, J11 have normal low level phase current, FIG. 6 thereby denoting low positive correlation of the healthy outgoing feeders corresponding to the measurement points J06, J07, J08, J10, J11 to the healthy incoming feeder corresponding to the measurement point J01 and to the faulty outgoing feeder corresponding to the measurement point J05. There is not any appreciable correlation of the other healthy parts of the substation corresponding to the measurement points J02, J03, J04, J09 to the healthy incoming feeder corresponding to the measurement point J01 or to the faulty outgoing feeder corresponding to the measurement point J05.

In the correlation coefficients of FIG. 6 the strong positive correlation in the phase current of phase L1 between the faulty outgoing feeder corresponding to the measurement point J05 and the incoming healthy feeder corresponding to the measurement point J01 as well as the low positive correlation in the phase current of phase L1 between the faulty outgoing feeder corresponding to the measurement point J05 and the other healthy outgoing feeders corresponding to the measurement points J06, J07, J08, J10, J11 indicates a short circuit fault in phase L1 of the outgoing feeder corresponding to the measurement points J05. This indication may further be verified by not having any appreciable correlation between the faulty feeder corresponding to the measurement point J05 and the other healthy parts of the substation corresponding to the measurement points J02, J03, J04, J09. Therefore, according to an embodiment, a short circuit fault in an outgoing feeder may be detected by a strong positive correlation in the phase current between an incoming feeder and an outgoing feeder as well as by low positive correlation in the phase current between the said outgoing feeder and at least one another outgoing feeder.

Because the behaviour of the short circuit fault between two and three phases provides substantially similar correlation coefficient matrix to that shown in FIG. 6, a matrix that is a combination of the correlation coefficients for phase currents for all phases L1, L2, L3 available in the electrical power network in use may also be applied.

The combination of the correlation matrixes may be used to minimize the computational effort needed to compute the correlation coefficients and memory space for storing the correlation coefficients, although the computing power and the memory space available by a central intelligent electronic device are typically totally adequate.

As can be seen in FIGS. 5 and 6, different kind of phenomena or incidents taking place in the galvanically interconnected network provide substantially unique patterns, like fingerprints of the phenomenon or incident in the network, when presented by correlation coefficients arranged in a form of matrix, which allows a simple but very informative visualization of the network phenomenon or incident.

Although in the example above all the necessary analysis, determination and computation was provided by the central intelligent electronic device CIED, the disclosed solution is applicable also in traditional electrical power networks, wherein there are feeder-specific intelligent electronic devices, such as protection and control relays, if at least one of those feeder-specific intelligent electronic devices may carry out the functionalities of the central intelligent electronic device CIED disclosed herein. Alternatively, there may be lower level and higher level intelligent electronic devices such that the tasks intended to be carried out are divided to different intelligent electronic devices. For example, referring to example of FIG. 1, the central intelligent electronic device CIED at the electric station ES may provide the lower level intelligent electronic device only collecting the measurement data and transmitting it to another intelligent electronic device providing the higher level intelligent electronic device for further processing the measured data. This kind of higher level intelligent electronic device may also be implemented for example as a cloud service.

It will be obvious to a person skilled in the art that, as the technology advances, the inventive concept can be implemented in various ways. The invention and its embodiments are not limited to the examples described above but may vary within the scope of the claims.

The invention claimed is:

1. A method for detecting a phenomenon in an electrical power network comprising at least one protection zone with at least two subzones, the method including measuring in the subzones of the protection zone at least one current signal actual in the respective subzone,
- determining linear dependencies between the at least one measured current signal actual in each subzone of the protection zone and the corresponding at least one measured current signal actual in each another subzone of the protection zone, and
- detecting the phenomenon in the protection zone of the electrical power network based on the determined linear dependencies, wherein the linear dependencies are determined by computing at least one correlation coefficient between the at least one measured current signal actual in each subzone of the protection zone and the corresponding at least one measured current signal actual in each another subzone of the protection zone,
- wherein the at least one computed correlation coefficient is compared with at least one limit value indicating a degree of linear dependency for detecting the phenomenon in the protection zone of the electrical power network,
- wherein in response to the at least one computed correlation coefficient indicating significant degree of linear dependency between corresponding current signals actual in at least two subzones of the protection zone the phenomenon having taken place in the protection zone of the electrical power network is detected,
- wherein the correlation coefficients indicating significant degree of linear dependency between corresponding current signals actual in at least two different subzones are compared for determining the subzone where the phenomenon has taken place and/or a type of the phenomenon, and
- wherein the phenomenon is a fault appearing in the galvanically interconnected electrical power network.

2. The method as claimed in claim 1, wherein
- samples of the at least one current signal actual in the subzone are collected substantially continuously,
- at least one sample sequence of a predeterminable number of the samples of the respective current signal is created, and
- the correlation coefficient between the sample sequence of the current signal actual in the subzone and the corresponding sample sequence of the corresponding current signal actual in another subzone is computed.

3. The method as claimed in claim 2, wherein
- in response to the collection of at least one new sample of the current signal the at least one new collected sample is added in the respective sample sequence to be the at least one last sample in the sample sequence and the corresponding number of samples being first in the sample sequence is discarded from the respective sample sequence, and
- the correlation coefficient between the sample sequence of the current signal actual in the subzone and the corresponding sample sequence of the corresponding current signal actual in another subzone is computed.

4. The method as claimed in claim 1, wherein the at least two subzones are formed by at least two feeders.

5. A system for detecting a phenomenon in an electrical power network comprising at least one protection zone with at least two subzones, the system including
- at least one measuring instrument for each subzone of the protection zone for measuring at least one current signal actual in the respective subzone,
- at least one intelligent electronic device configured to determine linear dependencies between the at least one measured current signal actual in each subzone of the protection zone and the corresponding at least one measured current signal actual in each another subzone of the protection zone, and
- the at least one intelligent electronic device configured to detect the phenomenon in the protection zone of the electrical power network based on the determined linear dependencies, wherein the linear dependencies are determined by computing at least one correlation coefficient between the at least one measured current signal actual in each subzone of the protection zone and the corresponding at least one measured current signal actual in each another subzone of the protection zone
- wherein the at least one intelligent electronic device is configured to compare the at least one computed correlation coefficient with at least one limit value indicating a degree of linear dependency for detecting the phenomenon in the protection zone of the electrical power network,
- wherein in response to the at least one computed correlation coefficient indicating significant degree of linear dependency between corresponding current signals actual in at least two subzones of the protection zone the at least one intelligent electronic device is configured to detect the phenomenon having taken place in the protection zone of the electrical power network,
- wherein the at least one intelligent electronic device is configured to compare the correlation coefficients indicating significant degree of linear dependency between corresponding current signals actual in at least two different subzones for determining the subzone where the phenomenon has taken place and/or a type of the phenomenon, and
- wherein the phenomenon is a fault appearing in the galvanically interconnected electrical power network.

6. The system as claimed in claim 5, wherein:
- the at least one measuring instrument in the subzone is configured to collect substantially continuously samples of the at least one current signal actual in the subzone,
- the at least one intelligent electronic device is configured to create at least one sample sequence of a predeterminable number of the samples of the respective current signal, and
- the at least one intelligent electronic device is configured to compute the correlation coefficient between the sample sequence of the current signal actual in the subzone and the corresponding sample sequence of the corresponding current signal actual in another subzone.

7. The system as claimed in claim 6, wherein:
- in response to collection of at least one new sample of the current signal the at least one intelligent electronic device is configured to add in the respective sample sequence the at least one new collected sample to be the at least one last sample in the sample sequence and to discard from the respective sample sequence the corresponding number of samples being first in the sample sequence, and
- the at least one intelligent electronic device is configured to compute the correlation coefficient between the sample sequence of the current signal actual in the subzone and the corresponding sample sequence of the corresponding current signal actual in another subzone.

8. The system as claimed in claim 5, wherein the at least two subzones are formed by at least two feeders.

* * * * *